Patented Aug. 6, 1929.

1,723,696

UNITED STATES PATENT OFFICE.

HANS HAHL AND LUDWIG SCHÜTZ, OF ELBERFELD, GERMANY, ASSIGNORS TO WINTHROP CHEMICAL COMPANY, INC., OF NEW YORK, N. Y.

PHARMACEUTICAL PRODUCT.

No Drawing. Application filed March 24, 1927, Serial No. 178,131, and in Germany November 6, 1922.

The present invention relates to compounds of the general formula:

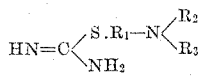

wherein $R_1$ represents an alkylene group and $R_2$ and $R_3$ represent either alkyl groups or hydrogen atoms, and to a process of preparing the same.

Our new products are obtainable, for instance, by causing thio urea to be acted upon, in the presence of an alkaline acting agent, by a compound of the general formula:

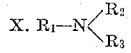

wherein X represents halogen, $R_1$ an alkylene group and $R_2$ and $R_3$ either alkyl groups or hydrogen atoms. They possess a physiological effect upon the uterus and upon the blood vessels causing their contraction. They are therefore valuable substitutes for secale cornutum. They form neutral salts with acids which retain the above defined valuable properties and are soluble in water and can be used for subcutaneous injections.

The new products are generally yellowish oils soluble in alcohol forming crystallizing salts with acids.

In order to illustrate our new process more fully the following example is given, the parts being by weight 6 parts of sodium are dissolved in 60 parts of alcohol and 20 parts of thiourea are added. Subsequently 36 parts of diethylamino-ethyl chloride are added. The reaction begins at the ordinary temperature and is accelerated by warming. The mixture is poured into water, the oil which separates is dried and distilled. It is a thick oil having most probably the formula:—

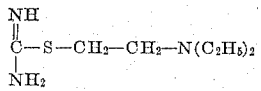

It boils at 140–143° C. under a pressure of 10 mm. With hydrochloric acid it forms a salt which crystallizes from alcohol in the shape of white needles soluble in water. The aqueous solution can be used for subcutaneous injections.

Other alkylhalogenides can be used e. g. ethylenebromide.

This application contains subject-matter which is related to that described and claimed in our co-pending application Ser. No. 659,657, filed August 27, 1923.

We claim:

1. The process which comprises treating thio urea in the presence of an alkaline acting agent with a compound of the general formula:

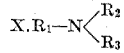

wherein X represents halogen, $R_1$ an alkylene group and $R_2$ and $R_3$ either alkyl groups or hydrogen atoms.

2. The process which comprises treating thio urea with diethylamino-ethyl chloride in the presence of sodium ethylate.

3. As new products the compounds of the general formula:

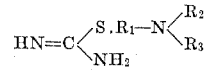

wherein $R_1$ represents an alkylene group and $R_2$ and $R_3$ represent either alkyl groups or hydrogen atoms, said compounds being generally oils, soluble in alcohol, forming salts with acids, and being valuable substitutes for secale cornutum.

4. As a new product the herein described diethylaminoethyl thio-urea, having most probably the formula:—

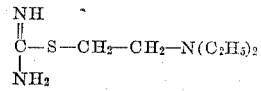

which is a thick oil, boiling at from 140–143° C. under a pressure of 10 mm., its hydrochloride crystallizing from alcohol in the shape of white needles and being a valuable substitute for secale cornutum.

In testimony whereof we have hereunto set our hands.

HANS HAHL.
LUDWIG SCHÜTZ.